Figures 1, 2:
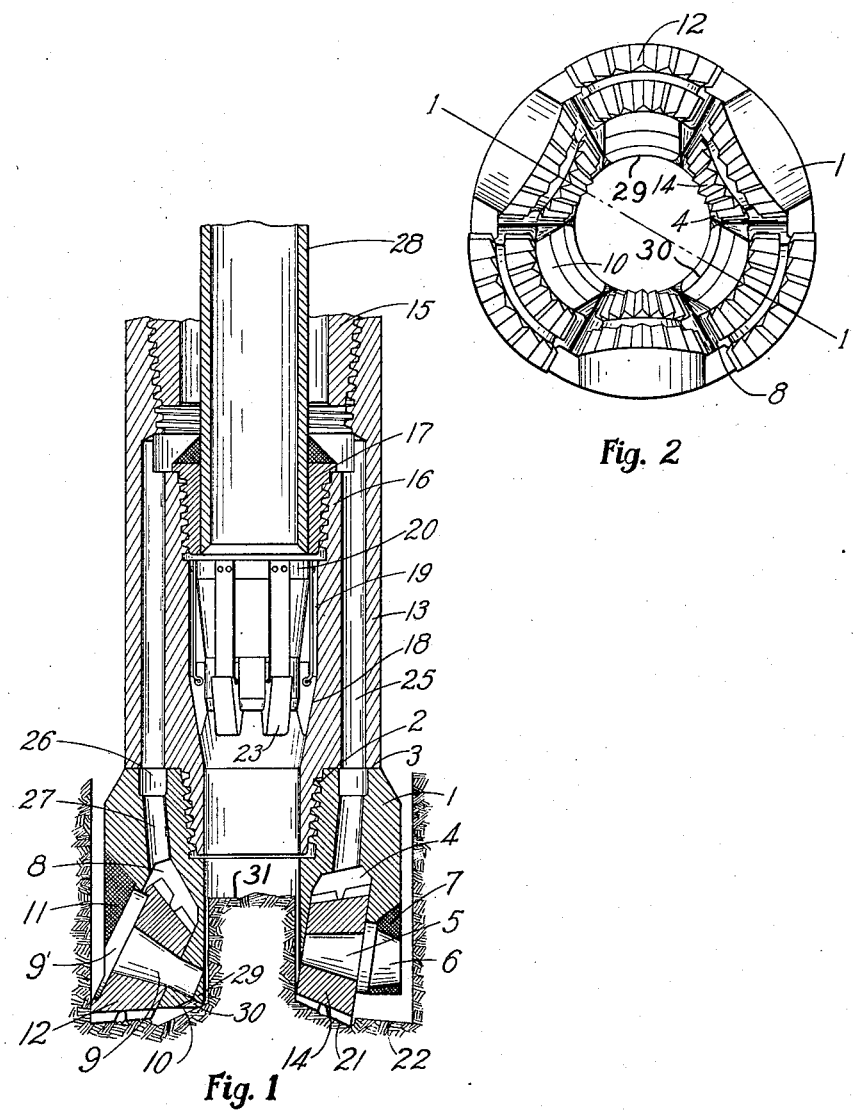

Aug. 30, 1932.   F. L. SCOTT   1,874,065
ROLLER CORE BIT
Filed July 5, 1928

Floyd L. Scott   INVENTOR
BY Jesse R. Stone
ATTORNEY

Patented Aug. 30, 1932

1,874,065

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

ROLLER CORE BIT

Application filed July 5, 1928. Serial No. 290,292.

My invention relates to core bits of the roller type adapted for use in rock and other hard formation.

In roller core drills it is common to provide some cutters shaped and positioned to cut the outside of the hole and other cutters positioned to cut the material about the core on the inner side of the annular hole. In positioning these two sets of cutters it is clear that each cutter should best be housed in the wall of the drill and should be shaped and inclined to have a true rolling motion upon the bottom of the hole. As the walls of the drill are necessarily limited as to thickness, it becomes a problem how to support the cutter pins so that the support will not extend in advance of the track cut by the cutter and thus bear upon the bottom of the hole.

It is an object of my invention to provide means for firmly supporting the cutter shafts from below and to so arrange the position of the cutters that a sufficient clearance for the cutter supports will be obtained.

Also, I desire to set the cutters, whose duty it is to cut the inner wall of the hole somewhat in advance of the outer cutters, thereby assisting in centering the drill and also acting to maintain the cutter bearings out of contact with the well bottom.

Referring to the drawing herewith, illustrating a drill employing my invention, Fig. 1 is a central vertical section through a core drill with my arrangement of cutters illustrated. Fig. 2 is a bottom plan view of the bit.

The drill bit includes a lower tubular head 1 having its upper end threaded internally at 2 to receive the lower end of the collar 13. The upper end has a shoulder 3 flattened to bear against a lower shoulder upon the collar.

At the forward end of the head are two sets of three cutters. One set of cutters 12 is positioned in slots 8 inclined inwardly at their upper ends, said cutters being rotatable on shafts 9, set in an inclined position to throw the lower ends of the cutters outwardly to bear against and cut the gauge of the well. The pins 9 are supported at their inner ends on the lower end 10 of the drill head and the outer ends of said pins are of enlarged diameter at 9' to form a thrust member for said cutter and adapted to be held in place by a bond of welding material 11 welded into the recess outside said thrust members. It will be noted that the wall 10 is necessarily extended well below the pin 9 to get the desired support.

The other set of three cutters 14 are spaced between the cutters 12 and are mounted and inclined to cut the inner side of the hole. Said cutters are mounted in pockets 4, inclined outwardly at their upper sides and rotatable on pins 5 having heads 6 held in position in advance of the main head by bonds of welded metal 7. The inner end of this pin has no support in the head.

As will be noted, the lower toothed side of the cutters 14 project slightly in advance of the cutters 12. Thus the track 21 cut by the inside cutters is lower in the stratum than the track 22 of the outer cutters.

The head 1 of the bit is operated through the collar 13, which has connection at its upper end with the drill stem or tool joint 15. The core barrel 28 has an enlarged head 17 welded thereto for screwing within the threaded seat 16 in the collar 13. Below the seat 16 is a chamber 19 to receive the core catcher 20 having dogs 23 adapted to engage within the tapered lower end 18 of the chamber 19 and be thereby moved into engagement with the core.

In order that the core be included within the core passage and yet allow the flushing fluid to wash the cuttings from the well bottom, I provide an acute rim 29 along the inner side of the bit. This is done by forming an annular groove 30 adjacent the said inner side of the wall 10. The rim 29 thus engages cuttings along the outer side of the core 31 and includes most of them within the core, but those away from the core are pushed outwardly into the track of the flushing fluid and are carried away to the surface. The flushing fluid is circulated downwardly through the drill stem and is conducted through passages in the collar 13 into a circumferential groove 26 in the head from which channels 27 allow circulation of the fluid into the pockets in which the cutters are mounted.

The feature of novelty in my present invention lies in the positioning of the cutters 14 so as to cut a path 21 sufficiently in advance of the cutters 12 that the inner wall 10 which supports the cutter pins 9 for the cutters 12 may be of sufficient thickness to hold up under the great stresses to which it is submitted in use.

The placing of the inner cutters 14 in advance of the outer cutters 12 is accomplished by supporting the pins 5 entirely by material 7 welded about the outer ends of the shaft at the forward end of the head, thereby, in effect, making the pin an integral part of the head.

I am, therefore, enabled to firmly support the pins of both sets of cutters with the sacrifice of no change in the proper position of the cutters, so that they will cut the bottom of the hole and roll thereon with a smooth rolling action which will not cause vibration and will not break up the core. The bit is also effectively centered in the hole and will be enabled to cut the hole straight and the core smooth.

What I claim is:

1. A core drill including a tubular head, an outer set of cutters mounted in pockets in the lower end of the head, pins upon which said cutters are rotatable, said pins being tapered and inclined downwardly at their inner ends, said inner ends of said pins being supported in the wall of the head, and an inner set of cutters mounted upon tapered pins inclined upwardly at their inner ends, said inner cutters projecting in advance of the said outer cutters and serving to cut a clearance for the wall supporting said outer cutter pins.

2. In a core drill, a tubular head, two sets of tapered cutters mounted on the forward end of said head with their smaller ends presented inwardly and rotatable on pins inclined to give said cutters a rolling motion, one set of said cutters positioned to cut the outer wall of the hole, and having an inner support in said head, and the other set positioned to cut the inner wall of the hole, said last named cutters projecting in advance of the others to cut a clearance for the support for said first named cutters.

3. In a core drill, a tubular head, having a central core opening inwardly tapered, rolling cutters mounted on the forward end thereof to cut the outer and inner walls of the hole about the core, said head having an annular groove in its forward end adjacent the inner edge to provide an acute rim about the said central core opening, the cutters at the inner wall of the hole projecting slightly in advance of those that cut the outer wall, to provide room ahead of said rim.

4. In a core drill, a tubular head having an axial core-receiving opening, the margin of which forms an acute edged rim to deflect material about the outer surface of the core outwardly away from the core whereby said material is caught by the flushing fluid, and leaves a clean core, and rolling cutters positioned to cut the sides of the hole.

In testimony whereof I hereunto affix my signature, this 19th day of June A. D. 1928.

FLOYD L. SCOTT.